United States Patent [19]
Hale et al.

[11] 4,454,411
[45] Jun. 12, 1984

[54] ODOMETER MOUNTED BETWEEN ROLLER SKATE WHEELS

[76] Inventors: William H. Hale, 245 Littleworth Rd., Dover, N.H. 03820; Robert E. Day, Beauty Hill Rd., Barrington, N.H. 03825

[21] Appl. No.: 415,169

[22] Filed: Sep. 7, 1982

[51] Int. Cl.³ .............................................. G01C 22/00
[52] U.S. Cl. ................................... 235/95 R; 235/96; 235/103; 235/133 A
[58] Field of Search ............ 235/95 R, 96, 103, 91 M, 235/133 A

[56] References Cited
U.S. PATENT DOCUMENTS

| | | |
|---|---|---|
| 2,138,887 | 12/1938 | Segal ............................. 235/95 R X |
| 2,354,708 | 8/1944 | Segal ................................. 235/95 R |
| 3,202,353 | 8/1965 | Nowak et al. ..................... 235/96 X |
| 3,387,778 | 6/1968 | Althaus ............................ 235/95 R |

*Primary Examiner*—Benjamin R. Fuller
*Attorney, Agent, or Firm*—Pearson & Pearson

[57] ABSTRACT

A roller skate has an odometer supported on a bracket located in the space between the rear wheels of the rear truck, the bracket being affixed on the truck by a U shaped shackle and shackle nuts. The odometer may be electronic, with digital display in a magnifying window and actuated by a magnet on a rear wheel. It may also be mechanical, actuated by a friction wheel rotated by a skate wheel and movable into and out of contact by a set screw or lever and spring arrangement. The odometer can be read by raising the heel after skating.

7 Claims, 12 Drawing Figures

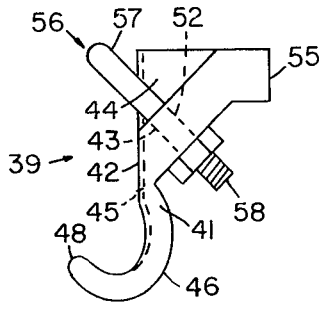
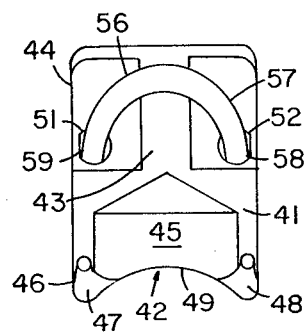
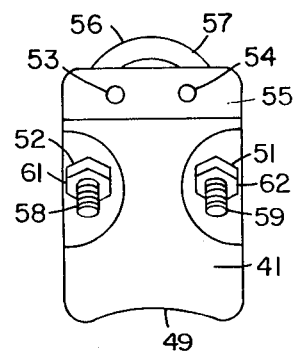
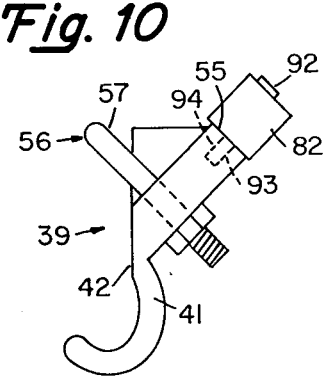
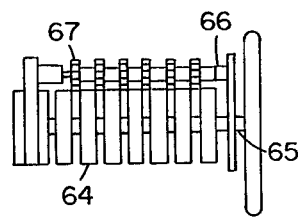
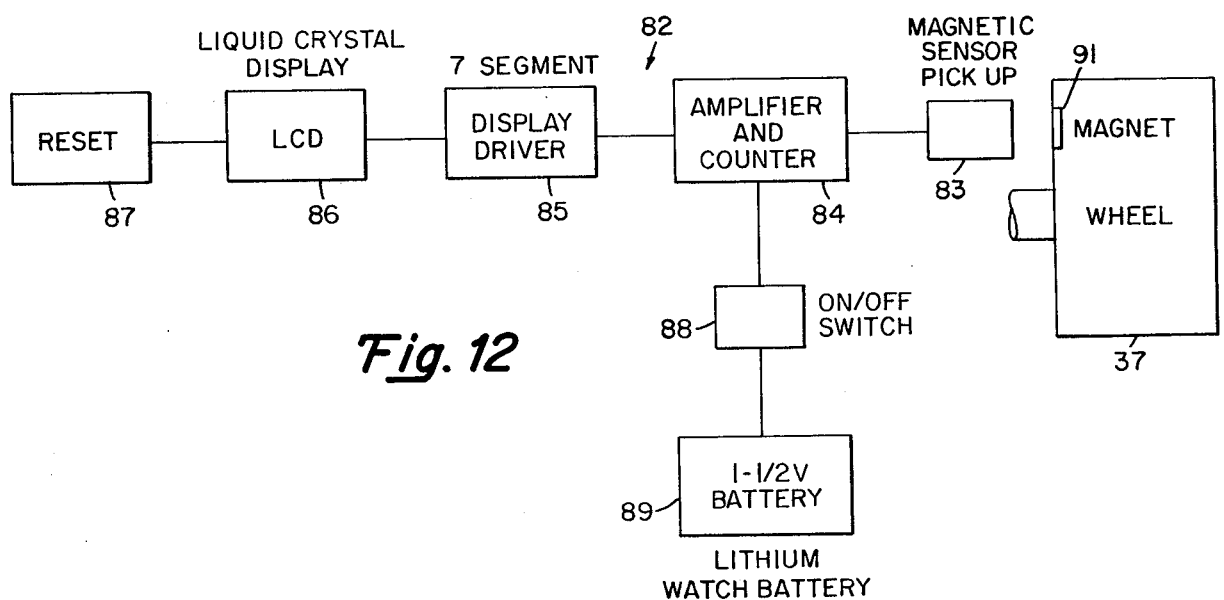

ODOMETER MOUNTED BETWEEN ROLLER SKATE WHEELS

BACKGROUND OF THE INVENTION

It has heretofore been proposed, in U.S. Pat. No. 2,138,887 to Segal of Dec. 6, 1938, to mount an odometer within one of the forward wheels of a roller skate, the odometer window being in the outer disc shaped retaining plate of the forward wheel and thus difficult for the skater to view while wearing the skates.

In U.S. Pat. No. 2,354,708 of Aug. 1, 1944, also to Segal, the measuring wheel, or odometer, is also mounted within the roller skate wheel and includes a needle, or pointer and dial readable on the outer side of the skate, but difficult for the skater to read, while wearing the skate, because the human leg does not bend easily sidewise outwardly.

A rolling hoop toy is provided with an odometer in U.S. Pat. No. 3,387,778 to Althaus of June 11, 1968 the odometer, or counting register, also being mounted diametrically across the span of the central opening of the circular hoop, and the viewing window being within the hoop and difficult to view.

SUMMARY OF THE INVENTION

While the above patents to Segal, disclose a roller skate wheel having an odometer built into it so as to measure distance travelled by a skater, none of the patents teach an odometer attached to the rear of a roller skate by an attachment located in the space between the rear wheels, and having a rearward-facing window which can be readily viewed while wearing the skates by simply raising the leg and turning the body.

The odometer of the invention is preferably in the form of an attachment which can be affixed to existing roller skates of the type most generally in use, and having identical, inverted T shaped front and rear trucks, each truck having a horizontal axle with a skate wheel at each opposite end, and a space therebetween and having an integral stem extending upwardly from the centre of the axle to a socket in the sole plate.

The attachment includes a clamp body which is detachably clamped against the stem of the rear truck by a U shaped shackle, having its bight extending around the stem and its legs extending through the body and tightened by threaded shackle nuts.

The odometer may be integral with the clamp body, or may be removably tightened thereon by a set screw or may be pivoted to the clamp body spring biased thereagainst but movable away therefrom by a manually operable lever.

The odometer may be of the mechanical type having a plurality of register wheels each having a series of digits on its margin for sequential display through a window such as a conventional Veeder type, or Schwinn bicycle type, and turned by a friction wheel or it may be an electronic, digital display type powered by a Duracell size N battery and actuated by sensing the rotation of a magnet around a path on the skate wheel.

BRIEF DESCRIPTION OF THE DRAWINGS

FIGS. 7, 8 and 9 are side, front and rear detail views respectively of the clamp body, shackle and shackle nuts of the invention.

FIG. 10 is a side view similar to FIG. 7 showing an electronic, digital odometer removably affixed on a clamp body.

FIG. 11 is a diagramatic view of a typical odometer mechanism slid out of its housing to show the register wheels, shafts etc. and FIG. 12 is a block circuit diagram of the electronic, digital odometer of the invention.

DESCRIPTION OF A PREFERRED EMBODIMENT

Figure 1:
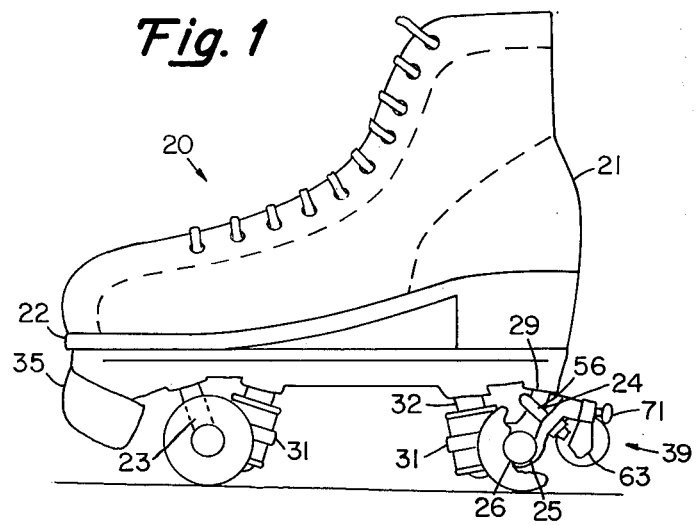
FIG. 1 is a side elevation of a typical roller skate, with part of a rear wheel broken away to show the rear truck mounting of the odometor of the invention.

In the drawings, a typical roller skate 20 is shown in FIG. 1, skate 20 having a shoe 21, a sole plate 22, identical front and rear assemblies 23 and 24, each assembly comprising an inverted T shaped truck 25, having a horizontal axle 26 integral with a central, stem 27, the upper tip 28 of the stem being anchored in a socket 29 in the sole plate. Each truck 25 also includes an integral loop 31, which encircles a post 32, between a pair of rubber washers 33 and 34. The shoe also includes a rubber toe bumper 35, all of the above being well known and forming part of the shoe skates now most in use in this country.

Figure 3:
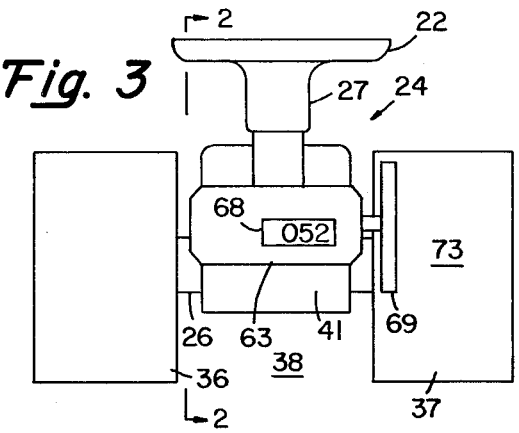
FIG. 3 is a rear elevation, of the odometer shown in FIG. 2.

As best shown in FIG. 3 each axle 26 extends laterally from its stem 27 and rotatably mounts in suitable bearings, a pair of roller skate wheels 36 and 37, each at an opposite end thereof with a substantial space 38 therebetween.

The odometer attachment 39 of the invention includes a clamp body 41 having an inner face 42 shaped and dimensioned (FIGS. 7, 8, and 9) with a central elongated generally vertically extending, groove 43 in the upper portion 44 and a generally horizontally extending recess 45 in the lower portion for receiving and tightly fitting against the corresponding outer face of the stem 27 and the axle 26 of rear truck 25. The lower portion 46 of clamp body 41 terminates in a pair of integral hooks 47 and 48, separated by an arcuate recess 49 which receives and fits around the lower cushion, or washer, 34. The clamp body 41 also includes a pair of shackle holes 51 and 52 as well as a pair of pin holes 53 and 54 in the rearward face thereof.

The clamp body is removably fixed on the rear truck 25 by a U shaped shackle 56, with the bight 57 extending around the stem 27 and the two threaded legs 58 and 59 each extending through one of the holes 51 or 52 in the clamp body 41 so that the threaded nuts 61 and 62 can tighten the clamp body 21 onto the rear truck with the face 55 facing rearwardly.

Figure 2:
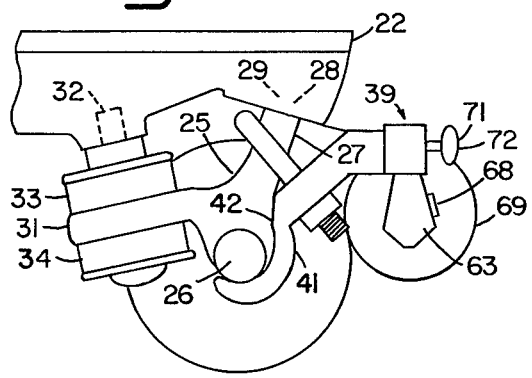
FIG. 2 is an enlarged fragmentary side elevation of the rear truck mounting of the invention, in section on line 2—2 of FIG. 3.

As shown in FIGS. 1 and 2 a mechanical odometer 63 of the conventional "Veeder", or "Schwinn" type having a plurality of digit carrying discs 64, all interconnected by suitable shafts 65 and 66 and gears 67, to produce a sequential display in the magnifying window 68 indicates the distance travelled in a suitable unit of measurement such as feet, yards, miles, kilometers, or the like all being well known.

The odometer 63 of FIGS. 1 and 2 is provided with a rubber tired wheel 69 fast on the laterally extending drive shaft 65 of the odometer. The odometer 63 has a pair of pins such as 71 which slidably fit in the pin holes 53 and 54 in the rear face 55 of clamp body 41 and a threaded set screw 72 is provided to advance or retract the odometer 63 and wheel 69 to vary the frictional pressure of the tire against the circumferential surface 73 of the skate wheel 37 or reduce it to zero for non-operation. The odometer shaft 65 is parallel to the axle 26, as shown in FIG. 3.

By mounting the clamp body 41 and odometer 63 in the space 38 between the rear wheels 36 and 37, with the magnifying window 68 facing rearwardly it is only necessary for the skater to lift the heel of the skate and slightly turn his body to read the odometer. The odometer can be easily removed for repair or when not needed, leaving the clamp body in place on the rear truck. While the odometer attachment 39 is located in the space between the rear wheels 36 and 37, the odometer 63 is located in rear of space 38 and projects as shown.

Figure 4:
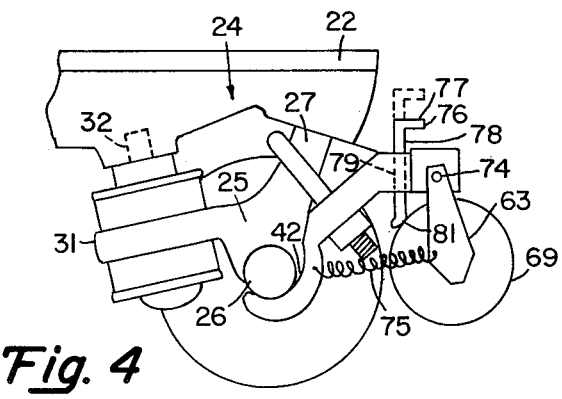
FIG. 4 is a view similar to FIG. 2, showing the spring-biased, lever-opened, pivoted connection of the odometer to the clamp body.

As shown in FIG. 4 the odometer 63 may be pivoted to the clamp body at 74 and connected by a coil spring 75 to bias the wheel 69 into frictional contact at predetermined spring pressure. A lever 76 having an upper handle 77, a central portion 78 slidable vertically in a slot 79 in clamp 41 and a bent tip 81 may be provided, so that downward movement of the lever pushes the odometer and wheel away from the clamp body and skate wheel for non-use.

As shown in FIGS. 5, 6, 10 and 12 an electronic digital odometer 82 may be used in place of the mechanical odometer 63.

In FIG. 12 a block circuit diagram shows the odometer 82 as having a magnetic sensor pick-up 83, amplifier and counter 84, a display driver 85 of the 7 segment type, and LCD (liquid crystal display) 86, a reset 87, an on-off switch 88 and a battery 89 of the 1½ volt lithium watch battery type, all of these components being well known.

A magnet 91 is affixed near the periphery of the skate wheel 37, so that it is sensed by pick-up 83 with each successive revolution of the skate wheel to respond by actuating the counting circuits of the odometer 82 and digitally display the result in the viewing window 92 corresponding to window 68 of odometer 63.

Figure 5:
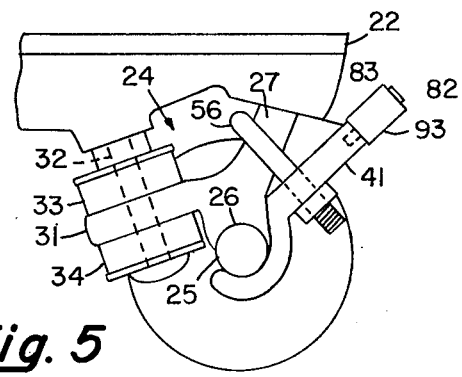
FIG. 5 is a view similar to FIGS. 2 and 4 showing an electronic, digital display odometer integral with the clamp body in section on line 5—5 of FIG. 6.
Figure 6:
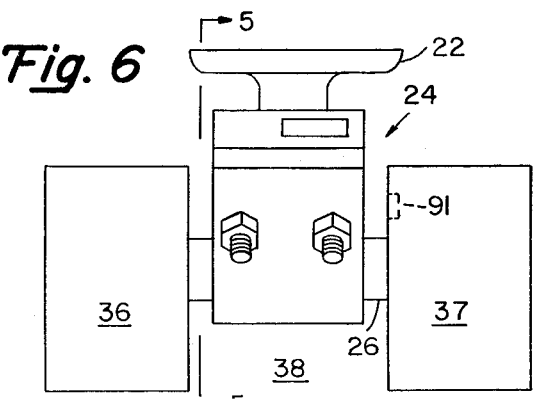
FIG. 6 is a rear elevation of the odometer shown in FIG. 5 and showing the magnet on the skate wheel for actuating the electronic odometer.

As shown in FIG. 5 and 6, the electronic odometer 82 may be integral with the clamp body 41, no friction wheel being necessary and the pick-up 83 being located to respond to a magnet 91 on the periphery of the skate wheel.

However, as shown in FIG. 10, it is preferred that the electronic odometer 82, be removable from the clamp body 21, by means of pins such as 93, snap fitting in pin holes 94 in the rear face 55 of clamp body 41, the window 92 facing rearwardly and upwardly for easy visibility of the skater.

We claim:

1. In combination with a roller skate of the type having front and rear wheel assemblies, the rear assembly comprising an inverted T shaped truck, the stem of said truck having an upper portion depending downwardly from the sole plate of the skate and having a lower portion connected to an integral laterally extending axle with a pair of roller skate wheels, each on an opposite end thereof, said stem and axle having an outer face;
    an odometer attachment for displaying the distance traveled by said skate;
    said attachment being located within the space between said roller skate wheels and including a clamp body having an inner face shaped and dimensioned to tightly fit against the corresponding outer face of said stem and axle of said rear truck and having a pair of shackle holes extending therethrough;
    a U shaped shackle, having a pair of threaded legs connected by a curved bight, said bight extending around the stem of said rear truck and said threaded legs each extending through one of said pair of shackle holes in said body;
    a pair of threaded nuts, each threaded on one of said threaded legs of said shackle for tightening said clamp body against the stem and axle of said rear truck;
    an odometer, mounted on said clamp body, to project in rear of the space between the roller skate wheels of said rear truck, said odometer having a window facing rearwardly; and
    means on one of said rear skate wheels for actuating said odometer to count the turns of said one wheel.

2. A combination as specified in claim 1 wherein:
    said odometer is mechanical and includes a shaft extending laterally therefrom and a rubber tired wheel fast on the end of said shaft and in contact with the circumferential surface of said one rear roller skate wheel, the odometer shaft being in parallelism with the axle of said wheel.

3. A combination as specified in claim 2 wherein:
    said odometer is movably mounted on said clamp body to permit said rubber tired wheel to move toward and away from the surface of said skate wheel; and
    set screw means connects said odometer to said clamp body to move said odometer and said rubber tired wheel into and out of contact with said roller skate wheel.

4. A combination as specified in claim 2 wherein:
    said odometer is pivotally mounted on said clamp body to permit said rubber wheel to move toward and away from the surface of said skate wheel;
    a spring connects said clamp body to said odometer to bias the said wheel into contact position with said rear wheel; and
    a manually operable lever is slidable in said clamp body to move said odometer and rubber tired wheel out of contact against the pull of said spring.

5. A combination as specified in claim 1 wherein:
    said odometer is electronic with a digital display and includes a magnetic sensing means for picking up successive rotations of said roller skate wheel; and
    said means for actuating said odometer is a permanent magnet, mounted near the periphery of said one roller skate wheel in position to be sensed by the magnetic sensing means of said odometer with each successive revolution of said skate wheel to actuate said digital display.

6. A combination as specified in claim 1 wherein:
    said clamp body includes a rearward face having a pair of pin holes therein and said odometer includes a pair of pins, each fitted in one of said holes, for mounting said odometer on said rearward face of said clamp body.

7. A combination as specified in claim 1 wherein:

the inner face of said clamp body includes a central, elongated, generally vertically extending groove in the upper portion for fitting around said stem; and a generally horizontally extending recess in the lower portion for receiving and tightly fitting against the axle of the rear truck.

said lower portion terminating in a pair of integral hooks separated by an arcuate recess.

* * * * *